Patented Nov. 26, 1940

2,223,316

UNITED STATES PATENT OFFICE 2,223,316

STABILIZED NUTRIENT SOLUTION

Carleton Ellis, Montclair, and Miller W. Swaney, Bloomfield, N. J., assignors to Ellis Laboratories, Inc., a corporation of New Jersey No Drawing. Application August 24, 1938, Serial No. 226,484

2 Claims. (Cl. 71—2)

This invention relates to the maintaining of salts or other substances intended as plant foods in solution. It applies particularly to nutrient solutions of plant foods and mixtures thereof as applied to the culture of plants by hydroculture methods without the aid of soil.

Methods of hydroculture, or soilless growth, are, namely, water-culture, sand-culture, and sub-irrigation. The first, or water-culture, method, consists of supporting a plant, e. g., by resting it on a wire screen, and allowing its roots to extend through the support and dip into an aqueous nutrient solution, said solution containing the elements necessary for plant growth.

The sand-culture method comprises supporting a plant by having its roots covered by sand and allowing nutrient solution to flow by gravity or otherwise through the sand and consequently coming in contact with the plant's roots. The sub-irrigation method consists of maintaining a plant's roots in a medium of coarse sand, gravel or cinders and the like and at regular intervals pumping nutrient solution from a sump or other container and flooding the aggregate bed, thereafter allowing the solution to drain back to the original reserve tank.

The various methods of soilless culture have been discussed more fully in a co-pending application, Serial No. 211,413, wherein Carleton Ellis has also described methods of regulating the acidity of nutrient solutions and ways of preventing precipitation of certain plant food elements from these solutions. Therein it was disclosed that certain water-soluble gums, of which gum arabic is an example, serve to keep in solution certain inorganic compounds which normally tend to precipitate from aqueous nutrient solutions. In the present invention we propose the use of inorganic substances for the purpose of maintaining homogeneity in aqueous nutrient solutions of plant foods.

It has been shown that for proper growth a plant must be supplied with moderate quantities of potassium, nitrogen, phosphorus, calcium, magnesium, and sulphur. In addition minute quantities of iron, manganese, copper, zinc, boron and iodine and the like must be added as the so-called "trace elements" group. These trace elements are particularly essential for flourishing growth of plants. A typical nutrient solution may have these elements present in the form of the following compounds: mono-potassium phosphate, calcium nitrate, magnesium sulphate, ferrous sulphate (and in some instances ferric compounds), boric acid or borax, and zinc, copper, and manganese sulphates, and potassium iodide. These substances, dissolved in their proper proportions in water, will ordinarily give nutrient solutions of pH value of about 5.5 to 6.5, depending somewhat on the pH of the water used. As an example, a nutrient solution may contain 0.5 gram per liter of $KH_2PO_4$, 1 gram per liter of $Ca(NO_3)_2.4H_2O$, 0.5 gram per liter of $MgSO_4.7H_2O$, 0.02 gram per liter of $FeSO_4.7H_2O$, and 0.001 gram-per-liter quantities of boric acid, manganese sulphate, zinc sulphate, copper sulphate, and nickel sulphate, respectively. At this value, and without the presence of agents to insure homogeneity, certain of the plant food elements tend to precipitate from solution as insoluble compounds, in which forms they are of no further value to the plant. Of these elements iron presents particular difficulty. In addition, other elements, e. g., copper, zinc, manganese, and the like, may, under certain conditions, tend to precipitate from nutrient solutions. These ordinarily comprise the "trace element" group in nutrient plant composition, being needed in very minute traces for proper plant growth. From a nutrient solution not containing a homogenizing agent of the type that we propose, iron will begin to precipitate ordinarily in a few hours. In doing so, iron becomes unavailable to the plant. The nutrient solution consequently develops an iron deficiency, chlorophyll formation in the plant cells slows down or ceases altogether, and the plant suffers from iron chlorosis, easily recognized as a yellowing of foliage.

By homogenizing agent we mean a substance which, when incorporated in aqueous nutrient solutions of plant food, will prevent the precipitation of these foods from said solutions, and thereby impart homogeneity to the culture medium.

In order to alleviate the difficulty just described, it has been common practice heretofore either to add additional quantities of iron at intervals of several days or to make a complete change in nutrient solution at similar intervals.

In a co-pending application, Serial No. 211,413, there was disclosed the addition of two ingredients to aqueous nutrient solutions for hydroculture work. One of these was a pH-controlling agent whose function it was to lower the pH value of the nutrient solution to a range in which plants could more successfully absorb and utilize the food elements carried in solution. The other ingredient, a precipitate-forming inhibitor, was incorporated in the nutrient solution in order to prevent certain of the food elements from precipitating in insoluble forms. Of the latter type, gum arabic was a typical example. This substance, an organic water-soluble carbohydrate gum, exerted a retentive effect on dissolved iron in nutrient solutions but did not serve as a plant food.

According to our present invention, however, we propose the use of certain water-soluble inorganic salts, particularly the salts of the phosphoric acids formed by the dehydration of orthophosphoric acid. We have observed that salts of this type (characterized by sodium metaphosphate, NaPO₃, and sodium pyrophosphate, Na₄P₂O₇) possess the ability to prevent the precipitation of iron and other trace elements from nutrient solutions and also serve as plant foods as well. For this reason we have termed this particular class of phosphates "homogenizing agents." In addition, some of the salts as proposed by our present invention are capable of lowering the pH values of nutrient solutions to ranges in which ions are more effectively absorbed and utilized by plants.

Still another object of this invention is to produce a fertilizing mixture for the hydroculture of plants which contains homogenizing agents free of combustible tendencies. Since various nitrates are often included in fertilizing compositions, the complete absence of organic material, which may serve as a precipitate-forming inhibitor, will tend toward freedom from combustible tendencies.

It has been pointed out that a salt of orthophosphoric acid, namely, sodium orthodihydrogen phosphate (NaH₂PO₄), is suitable for use as a plant food. This salt, in addition to serving as a plant food, is capable of lowering the pH of nutrient solutions. Although its ability to increase acidity tends to hold iron and other trace elements in solution for some time, sodium dihydrogen orthophosphate does not exert any protective influence on iron other than through lowering the pH. Consequently, iron and some other trace elements tend to precipitate ordinarily in a few hours or a few days in insoluble forms. We have observed, however, that salts of acids formed by dehydrating orthophosphoric acid are very valuable for homogenizing nutrient solutions, i. e., preventing the precipitation of iron and other trace elements from nutrient solutions. We have observed that this phenomenon, which is exerted by the latter of these phosphates, is not dependent on their ability to increase the acidity of solutions.

Orthophosphoric acid, H₃PO₄, is capable of forming three salts, as illustrated with its sodium salts below.

$$H_3PO_4 + NaOH \rightarrow NaH_2PO_4 + H_2O$$
$$H_3PO_4 + 2NaOH \rightarrow Na_2HPO_4 + 2H_2O$$
$$H_3PO_4 + 3NaOH \rightarrow Na_3PO_4 + 3H_2O$$

In addition, orthophosphoric acid, by dehydration, yields metaphosphoric acid (HPO₃) and pyrophosphoric acid (H₄P₂O₇), as shown.

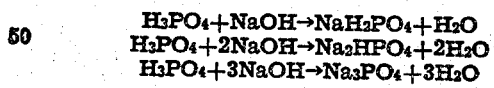

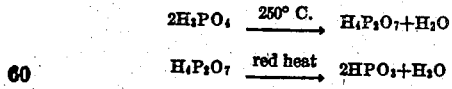

Now, each of these phosphoric acids (meta- and pyro-) formed by dehydrating orthophosphoric acid (H₃PO₄) may in turn form salts with alkalies. Pyrophosphoric acid may form either normal salts (e. g., Na₄P₂O₇) or secondary salts (e. g., Na₂H₂P₂O₇). Although metaphosphoric acid forms only a normal salt (e. g., NaPO₃), it is capable, nevertheless, of forming coordination compounds. For example, in addition to the sodium mono-meta-phosphate, NaPO₃, there are also sodium di-metaphosphate, Na₂P₂O₆, sodium tri-metaphosphate, Na₃P₃O₉, and so on up to sodium hexa-metaphosphate, Na₆P₆O₁₈. Some of the lesser coordinated of these metaphosphates give acid reactions when dissolved in water. Certain of those metaphosphates associated to a greater extent have little effect on the pH of water in which they are dissolved. We have observed that some of the lower of these metaphosphates, along with certain of the salts of pyrophosphoric acid, are particularly beneficial when added to nutrient solutions of plant foods. These phosphates serve to retain in solution iron and other trace elements hereinbefore described which normally tend to precipitate in insoluble forms. On the other hand, we have observed that of the higher phosphates, for example, sodium hexa-metaphosphate has little tendency, in some cases at least, to prevent the precipitation of trace elements from nutrient solutions.

A nutrient solution of the type that is proposed, that is, one containing sodium metaphosphate, or sodium pyrophosphate, and the like, in addition to the regular plant food elements, may be used for much longer periods without replacement of iron because of the fact that the nutrient solution thus prepared possesses such homogeneity as to remain perfectly clear for weeks without even the slightest trace of precipitate. In this way the plant food elements that are added to the solution at the outset remain dissolved in the solution during prolonged periods of standing and thereby remain available to plants for extended periods without having to be replaced at short intervals as is the case with nutrient compositions devoid of homogenizing agents of the type that we propose.

We are aware that sodium hexa-metaphosphate has previously been proposed for use in conjunction with certain detergent compositions to prevent the precipitation of calcium and magnesium of hard waters. However, we wish to make a clear and sharp distinction between the use of sodium hexa-metaphosphate (Na₆P₆O₁₈) for the prevention of precipitation of calcium and magnesium, and the present invention, which comprises precisely the use of sodium monometaphosphate (NaPO₃) and like substances for the prevention of precipitation of iron and other trace elements from aqueous nutrient solutions. The differences in the constitutions and behaviors of these two metaphosphates are outstanding. The distinctions we wish to emphasize are as follows:

1. Sodium metaphosphate, NaPO₃, is a monomeric compound which is but slightly soluble in water, one gram of sodium metaphosphate dissolving in about 1200 grams of water at 25° C. In doing so it gives a distinctly acid reaction, bringing the pH of the solution well below 7. On the other hand, sodium hexa-metaphosphate is a coordinated compound of the formula Na₆P₆O₁₈. It is very easily soluble in water, one gram of the hexa-metaphosphate readily dissolving in two grams of water. As a further contrast to the mono-metaphosphate, the hexa-metaphosphate produces practically no change in the pH of water in which it is dissolved.

2. Sodium hexa-metaphosphate, as proposed for incorporation in detergent compositions, is specifically advocated for use for the prevention of the precipitation of calcium and magnesium in alkaline soap solutions whose pH values are greater than 7, say, pH 9.0 to 10.0 or higher. On the other hand, we propose to use sodium monometaphosphate for the prevention of the precipitation of iron and other "trace elements" in aqueous nutrient solutions of a range of pH below 7.0, usually from about 4.0 to 6.5. In the nutrient solutions of the type that we propose little or no difficulty is encountered in keeping calcium and magnesium in solution, and since the previous references to the use of hexa-metaphosphate are concerned with the precipitation of calcium and magnesium, we claim this as a further distinction for the invention.

3. Still another, and very conclusive, differentiation between the hexa-metaphosphate, which has been suggested for use with detergents, and the mono-metaphosphate as proposed by the present invention is that whereas sodium mono-metaphosphate serves to retain iron in nutrient solutions and prevent its precipitation, sodium hexa-metaphosphate fails to prevent the precipitation of iron from some acidic nutrient solutions.

Sodium mono-metaphosphate serves several purposes when added to aqueous nutrient solutions. First, it lowers the pH value of the nutrient solution and tends to produce a more desirable acidity range for the assimilation of the food elements by the plants. Secondly, it exerts a very marked inhibitory effect on the precipitation of the food elements which normally possess tendencies to precipitate from solution. In addition to the above-mentioned duties fulfilled by sodium mono-metaphosphate this substance is in itself a plant food, being a very effective and concentrated source of phosphorus.

The present invention is not limited, of course, to the sole use of the sodium salts of the meta- and pyrophosphates. If desired, we may use potassium salts or any other salts of these acids which are sufficiently soluble in water to inhibit the precipitation of iron, and the like, from nutrient solutions. Or, we may add substances which will react in the nutrient solution to give metaphosphates or pyrophosphates or substances which act to prevent precipitation of iron and the like. For example, we may add to a balanced nutrient solution a small amount of meta- or pyrophosphoric acid and an equivalent quantity of alkali in order to keep the acidity of the solution under control. In some instances we may use meta- and pyrophosphates together in a nutrient composition.

The following examples will serve to illustrate the homogenizing function of sodium mono-metaphosphate according to the present invention.

*Example 1.*—The following materials were ground to a homogeneous powdery mixture in a ball mill:

| | Grams |
|---|---|
| $NaH_2PO_4 \cdot H_2O$ | 60 |
| $KNO_3$ | 100 |
| $CaSO_4 \cdot 2H_2O$ | 60 |
| $MgSO_4$ | 60 |
| $NH_4Cl$ | 25 |
| $NaHSO_4$ | 3 |
| $NaPO_3$ (sodium mono-metaphosphate) | 10 |
| $FeSO_4 \cdot 7H_2O$ | 4 |
| $H_3BO_3$ | 0.08 |
| $MnSO_4$ | 0.08 |
| $ZnSO_4$ | 0.08 |
| $CuSO_4$ | 0.02 |
| $NiSO_4$ | 0.04 |
| $KIO_3$ | 0.20 |

In one liter of tap water (pH 8.2) were dissolved 1.3 grams of this mixture. The clear solution of pH 5.0 which resulted was allowed to stand in an open container. After two weeks this solution was still perfectly clear and showed no tendency to form precipitates.

*Example 2.*—The following materials were ground to a homogeneous powder in a ball mill:

| | Grams |
|---|---|
| $NaH_2PO_4 \cdot H_2O$ | 60 |
| $KNO_3$ | 100 |
| $CaSO_4 \cdot 2H_2O$ | 60 |
| $MgSO_4$ | 60 |
| $NH_4Cl$ | 25 |
| $NaHSO_4$ | 7 |
| $FeSO_4 \cdot 7H_2O$ | 4 |
| $H_3BO_3$ | 0.08 |
| $MnSO_4$ | 0.08 |
| $ZnSO_4$ | 0.08 |
| $CuSO_4$ | 0.02 |
| $NiSO_4$ | 0.04 |
| $KIO_3$ | 0.20 |

In one liter of tap water (pH 8.2) were dissolved 1.3 grams of the above mixture. The clear solution which resulted possessed a pH of 5.2. The addition of a small amount of sulphuric acid lowered this value to 5.0, so that it corresponded with that of the solution of Example 1. When this solution was placed in an unstoppered bottle and allowed to stand, its iron began to precipitate after several hours, and at the end of one day the iron was largely in the form of an insoluble precipitate.

The following examples will serve to illustrate the retention of iron and other trace elements in nutrient solutions by the use of pyrophosphates.

*Example 3.*—The following materials were ground to a homogeneous powder in a ball mill:

| | Grams |
|---|---|
| $NH_4H_2PO_4$ | 70 |
| $NaNO_3$ | 60 |
| $KCl$ | 55 |
| $CaSO_4 \cdot 2H_2O$ | 58 |
| $MgSO_4$ | 53 |
| $NaHSO_4$ | 3 |
| $FeSO_4 \cdot 7H_2O$ | 4 |
| $H_3BO_3$ | 0.08 |
| $MnSO_4$ | 0.08 |
| $ZnSO_4$ | 0.08 |
| $CuSO_4$ | 0.02 |
| $NiSO_4$ | 0.04 |
| $KIO_3$ | 0.20 |

When 1.3 grams of this powder were dissolved in 1 liter of water of pH 8.2, the resulting clear solution possessed a pH value of 5.5. When this solution was placed in an unstoppered bottle and exposed to the air, a cloudiness developed within a few hours, and within 1 day the iron had precipitated in an insoluble form.

*Example 4.*—A composition was made by grinding the following materials to a homogeneous powder:

| | Grams |
|---|---|
| $NH_4H_2PO_4$ | 70 |
| $NaNO_3$ | 60 |
| $KCl$ | 55 |
| $CaSO_4 \cdot 2H_2O$ | 58 |
| $MgSO_4$ | 53 |
| $NaHSO_4$ | 2 |
| $Na_4P_2O_7 \cdot 10H_2O$ | 10 |
| $FeSO_4 \cdot 4H_2O$ | 4 |
| $H_3BO_3$ | 0.08 |
| $MnSO_4$ | 0.08 |
| $ZnSO_4$ | 0.08 |
| $CuSO_4$ | 0.02 |
| $NiSO_4$ | 0.04 |
| $KIO_3$ | 0.20 |

When 1.3 grams of this composition were dissolved in 1 liter of water of pH 8.2, a clear solution resulted which possessed a pH value of 5.5. When this solution was allowed to stand exposed to the atmosphere, it was found to be perfectly clear after two weeks' time.

It is not to be implied that the invention excludes the addition of the iron salts of phosphoric acids formed by dehydrating orthophosphoric acid. On the contrary, instead of adding iron, for example, as the sulphate, and the meta- or pyrophosphate as sodium meta- or pyrophosphate, we may, if desired add iron salts of meta- or pyrophosphoric acid. As an example of the use of ferric pyrophosphate the following is given:

*Example 5.*—The following materials were ground to a homogeneous powder in a ball mill:

| | Grams |
|---|---|
| $NH_4H_2PO_4$ | 50 |
| $KNO_3$ | 125 |
| $NaNO_3$ | 50 |
| $KCl$ | 40 |
| $CaSO_4 \cdot 2H_2O$ | 40 |
| $MgSO_4$ | 35 |
| Ferric pyrophosphate, soluble, pearls, U. S. P. | 4 |
| $NaHSO_4$ | 1 |
| $H_3BO_3$ | 0.08 |
| $MnSO_4$ | 0.08 |
| $ZnSO_4$ | 0.08 |
| $CuSO_4$ | 0.02 |
| $NiSO_4$ | 0.04 |
| $KIO_3$ | 0.20 |

When 1.3 grams of the above composition were dissolved in 1 liter of tap water of pH 8.2, the resulting clear solution possessed a pH 5.8. This solution when allowed to stand exposed to the atmosphere was found to be clear and free from insoluble precipitates even after one week.

It will be seen from the foregoing that the invention comprises adding homogenizing agents to nutrient compositions suitable for use in hydroculture. More particularly it comprises adding water-soluble pyro- and metaphosphates to nutrient plant compositions containing iron, the purpose of these phosphates being simultaneously to prevent precipitation of iron and other metals from nutrient solutions and to lower the pH values of these nutrient solutions formed by dissolving said nutrient plant compositions in water. The homogenizing agents that we propose are also of the type that are capable of acting as plant foods. It is to be understood, however, that the invention is not restricted merely to the retention of iron in nutrient solution, but applies to the prevention of the precipitation of other metallic elements as well. It should be remembered that the class of plant nutrients designated as trace elements embraces not only iron but also copper, manganese, zinc, tin, and the like.

What we claim is:

1. A plant nutrient solution substantially devoid of carbon-containing compounds and having a pH not less than about 4.5 and not greater than about 6.5, which comprises water-soluble inorganic plant nutrient salts of the group containing the elements potassium, nitrogen, phosphorus, calcium and magnesium, and in addition water-soluble salts containing the trace elements iron, manganese, boron, nickel, zinc and copper and also a water-soluble inorganic salt of a monomeric metaphosphoric acid, the proportion of said salt of monomeric metaphosphoric acid being sufficient to prevent precipitation of elements of the group consisting of iron, manganese, boron, nickel, zinc and copper.

2. A plant nutrient solution, according to claim 1, in which the salt of monomeric metaphosphoric acid is sodium monomeric metaphosphate.

CARLETON ELLIS.
MILLER W. SWANEY.